Dec. 22, 1953 J. F. SMITH 2,663,525
PARACHUTE PACK
Filed Oct. 21, 1950 2 Sheets-Sheet 2
FIG. 4
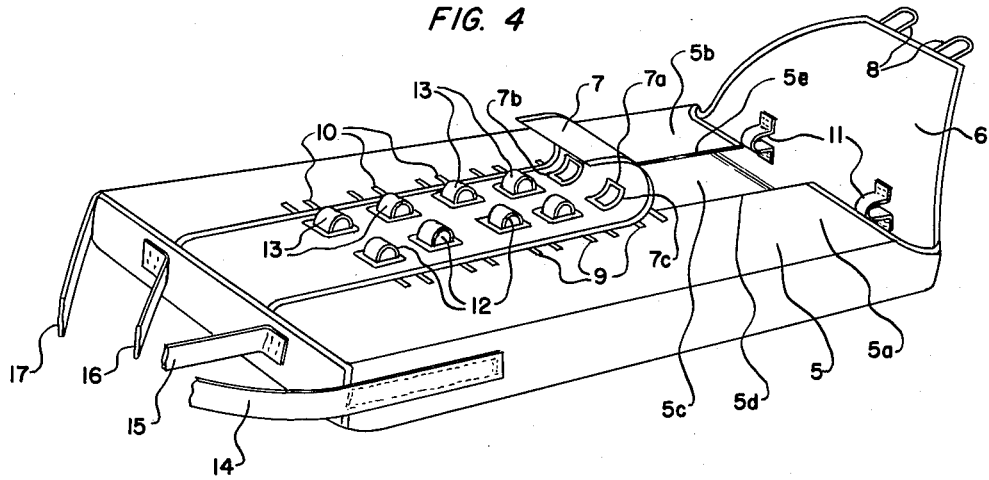
FIG. 5
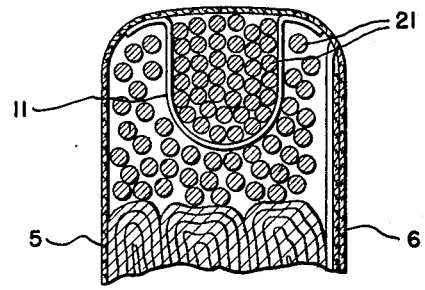
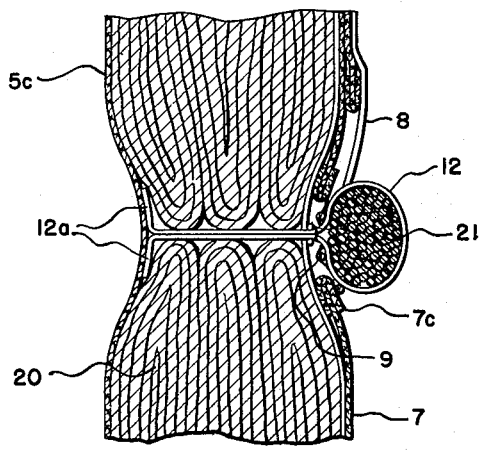
INVENTOR.
JAMES FLOYD SMITH
BY
Wm. H. Dean
AGENT Patented Dec. 22, 1953

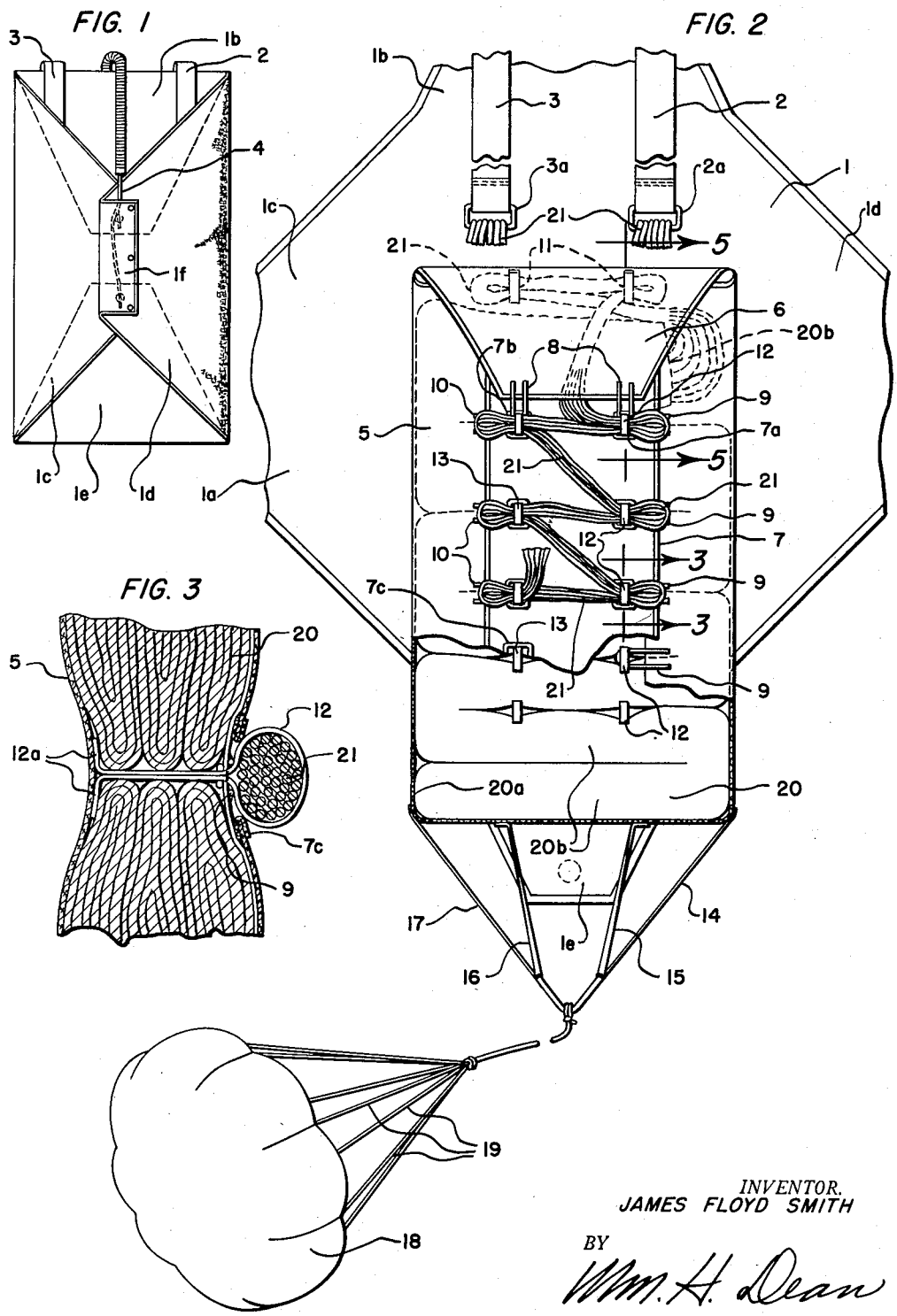

2,663,525

UNITED STATES PATENT OFFICE 2,663,525

PARACHUTE PACK

James Floyd Smith, Glendale, Calif.

Application October 21, 1950, Serial No. 191,479

14 Claims. (Cl. 244—148)

My invention relates to a parachute pack and the objects of my invention are:

First, to provide a parachute carrying pack container which encloses and maintains a parachute in orderly folded condition in a thin, flat, neat package without any semi-rigid supports within the pack or any elastic fasteners.

Second, to provide a parachute pack having a container adapted to be retained in closed position by loops of the suspension lines whereby the container may be deployed. Subsequently the suspension lines are deployed which release the container providing an orderly releasable locking means for the container by employing the parachute suspension lines.

Third, to provide a parachute pack having means for progressively deploying the suspension lines first, followed by the skirt of the parachute. The parachute is deployed progressively to its vent whereby the snatch load on the parachute is greatly reduced, thus eliminating hazard to the parachute and suspension lines during the completion of deployment in connection with a load.

Fourth, to provide a parachute container which incorporates folded flaps held by the parachute suspension lines whereby the entire container is opened when the suspension lines are pulled out permitting the parachute canopy to be freely deployed without friction or entanglement with the container.

Fifth, to provide a parachute pack which is maintained in a thin, firm package without the use of stiffening devices and in which the parachute canopy is fixed in orderly folded position which cannot be deranged by very rough usage of the parachute pack.

Sixth, to provide a parachute pack in which a container for the parachute is provided with bight loops extending from one side to the other intermediate the folds of the parachute canopy through which bights of the parachute suspension lines are positioned for fastening the flaps of the parachute container, which prevents displacement of the packed completed portions of the parachute of the container, and promotes progressive deployment of the parachute suspension lines and canopy, respectively;

Seventh, to provide a parachute pack of this class which is very comfortable when used as a backrest or a seat cushion; and Eighth, to provide a parachute pack of this class which is very simple and economical of construction, efficient, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a rear elevational view of my parachute pack; Fig. 2 is an enlarged rear elevational view thereof, showing the parachute pack cover in open position, with the parachute in open position, and illustrating portions broken away and in section to amplify the illustration; Fig. 3 is an enlarged fragmentary sectional view, taken from the line 3—3 of Fig. 2; Fig. 4 is a perspective view of the parachute container of my parachute pack, showing portions broken away to facilitate the illustration; and Fig. 5 is an enlarged fragmentary sectional view, taken from the line 5—5 of Fig. 2.

Similar characters of reference refer to similar parts and portions throughout the several views of the drawings.

The parachute pack cover 1, harness straps 2 and 3, rip cord 4, parachute container 5, container flaps 6 and 7, flap loops 8, 9 and 10, suspension line bight straps 11, 12 and 13, pilot bridle straps 14, 15, 16 and 17, pilot parachute 18, pilot parachute suspension lines 19, main parachute 20, and the main parachute suspension lines 21, constitute the principal parts and portions of my parachute pack.

The parachute pack cover 1, as shown in Figs. 1 and 2 of the drawings, is provided with an enclosed back portion 1a and flap portions 1b, 1c, 1d and 1e, which extend in rectangular relationship to each other when the parachute pack cover 1 is in the open position, as shown in Fig. 2 of the drawings. The flaps 1b and 1e fold over the normally upper and lower ends, respectively, of the container 5, while the flaps 1c and 1d fold over the normally lateral edges of the container 5, and are secured by the rip cord 4. It will be noted that the ends of the flaps 1b and 1e carry the conventional rip cord attachments which extend through grommets in the flaps 1c and 1d. The flap 1d is provided with a folded portion, 1f, which is adapted to cover the rip cord ends of the rip cord 4, which are conventional devices.

The parachute pack cover 1 is adapted to contain the container 5 and the pilot parachute 18 in substantially the same manner as disclosed in my former Patent No. 2,316,895, issued April 20, 1943. This pilot parachute 18 is a spring-opening pilot parachute, which opens the flaps 1b, 1c, 1d and 1e when the rip cord 4 is pulled, exposing the container 5, as shown in Fig. 2 of the drawings. The harness riser straps 2 and 3 are conventional harness straps, provided with attachment loops 2a and 3a, with which the suspension lines 21 of the main parachute 20 are connected.

The parachute container 5 is provided with flaps 6 and 7, secured at opposite ends thereof, and it is also provided with side flaps 5a and 5b, all of which are fixed to the back 5c of the container 5, which is a continuous piece of flexible fabric material. Secured to the flap portions 5a and 5b are the flap loops 9 and 10, respectively, which are arranged in spaced relation longitudinally of the flap portions 5a and 5b, adjacent the edges 5d and 5e thereof. The flap 7 is provided with openings 7a and 7b substantially coinciding with and adjacent to the flap loops 9 and 10, respectively. The suspension line bight loops 12 and 13 project through said openings 7a and 7b, and said flap loops 9 and 10, respectively, all as shown best in Figs. 2, 4 and 5 of the drawings.

These suspension line bight straps 12 and 13 are substantially identical, and as shown in Figs. 3 and 5 of the drawings, the loop-shaped suspension line bight straps 12 are sewed by stitches 12a to the rear enclosed side of the container 5. The suspension line bight straps 12 and 13 at their loop portions serve as suspension line retainers. It will be noted that the flap loops 9 are adapted to each surround one of the suspension line bight loops 12 or 13, as shown in Fig. 2 of the drawings, and these suspension line bight loops are adapted to retain folded portions of the main parachute suspension lines 21 for securing the flaps 6 and 7 in connection with the flaps 5b and 5d, all as shown best in Figs. 2, 3 and 5 of the drawings. It will be noted that the suspension line bight straps 11 are secured to the flap 6, and are adapted to hold the suspension lines 21 adjacent the skirt of the parachute 20, which is positioned adjacent said flap 6.

As shown in Fig. 2 of the drawings, the parachute suspension lines 21 pass under the flap 6 and through the loops 11 and to the skirt of the parachute 20. The vent end 20a of the parachute 20 is positioned in the end of the container 5, adjacent to the straps 14, 15, 16 and 17, which are secured to the suspension lines 19 of the pilot parachute 18. The main parachute 20 is provided with a plurality of folded portions 20b, which are folded against themselves in zig-zag relationship within the container 5, as shown best in Fig. 2 of the drawings. Intermediate these folded portions, the loops 12 and 13 extend and interconnect the rear portion 5c of the container 5 and the flap 7 in its connected relationship with the flap portions 5d and 5e, and the loops 9 and 10. It will be here noted that the openings 7a and 7b in the flap 7 are reinforced by tape 7c, as shown in Figs. 3 and 5 of the drawings.

It will be noted that the suspension line bight straps 12, and also the suspension line bight straps 13 are progressively spaced farther apart from the pilot parachute end of the container 5, and the opposite end on which the flap 6 is positioned. This progressively increased spacing is necessary in order to accommodate the increasing thickness of the parachute at its zig-zag folded portions within the container 5 toward the skirt end of the parachute, which is more bulky. It will be noted that the main parachute suspension lines 21 extend from the skirt 20b of the main parachute 20 through the suspension line bight straps 11, and then in a zig-zag disposition through the suspension line bight straps 12 and 13 to a position near the end of the container 5, with which the straps 14, 15, 16 and 17 are connected. The suspension lines then extend to the loops 2a and 3a of the harness straps 2 and 3, which are connected to the load and/or the cover 1.

The operation of my parachute pack is substantially as follows:

The suspension line bight straps 12 and 13, intermediate the folded portions of the parachute 20, maintain the same in certain position within the container 5, providing a neat, thin, firm pack, which may be used and thrown about without displacing the parachute 20 in its packed condition within the container 5. The container 5 is thus maintained in shapely condition without the necessity of employing stiffeners or elastic fasteners of any kind. When the pack, as shown in Fig. 1, is applied to personnel or a load, and the rip cord 4 is pulled, the pilot parachute 18, of the spring-loaded type hereinbefore described, opens the flaps 1b, 1c, 1d and 1e into the position as shown in Fig. 2, wherein the pilot parachute 18 is deployed, which suspends the container 5 by means of the straps 14, 15, 16 and 17. Drag of the pilot parachute 18 causes the container 5 to be pulled away from the harness straps 2 and 3 which causes the suspension lines 21 connected therewith to be progressively removed from the suspension line bight straps 12 and 13 toward the flap 6 on the container 5. When the suspension lines 21 are pulled from the last pair of suspension line bight straps 12 and 13, the loops 8 on the flap 6 are released and the flap 7 is released whereupon the suspension lines are progressively pulled from the suspension line bight straps 11 at which time the suspension lines are completely deployed before the main parachute 20 is released from the container 5. It will be noted that the main parachute 20 is then progressively deployed, skirt first and canopy last, so that the snatch load of the main parachute 20 is reduced to a minimum. During deployment of the main parachute 20 from the container 5, the flaps 6 and 7 are completely free and the flap portions 5a and 5b are open permitting the parachute to be drawn out of the container 5 without any frictional resistance or entanglement. It will be here noted that during the release of the suspension lines 21 from the suspension line bight straps 12 and 13 that the loops 9 and 10, respectively, are concurrently released which releases the flaps 5a and 5b from the flap 7.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new, and desire to secure by Letters Patent, is:

1. A folded parachute, a container having flap portions folded about said parachute, the edges of said container having means for locking the same in overlapped position, flexible loops extending in parallel rows and being secured on the inner side of said container, said loops engaging said means and fastening said means, whereby said parachute and said container are releasably maintained in folded relationship.

2. A folded parachute, a container having flap portions folded about said parachute, the edges of said container having means for locking the same in overlapped position, flexible loops engaging said means and fastening said means, said parachute having suspension lines extending through said loops outwardly of said means for securing said container in closed position.

3. A folded parachute having a plurality of contiguous folded portions, a container in which said parachute is disposed, flexible loops in parallel rows, extending from one side of said container between said folded portions and through openings in opposite portions thereof for holding said parachute therein.

4. A folded parachute having a plurality of contiguous folded portions, a container in which said parachute is disposed, flexible loops in parallel rows, extending from one side of said container between said folded portions and through openings in opposite portions thereof for holding said parachute therein, suspension lines of said parachute having folded bight portions extending through said loops for locking opposite sides of said container securely about said parachute therein.

5. A container, a parachute having a canopy arranged in a plurality of contiguous folded portions positioned within said container, flexible means attached to one side of said container and extending between said folded portions of the canopy of said parachute and having suspension line retainers spaced from said one side of said container, said container having flaps at the opposite side thereof spaced from said one side and provided with apertures through which said means extends, said parachute having suspension lines extending through said suspension line retainers outwardly of said apertures whereby said suspension lines are releasably stowed and serve as locking means for said flap portions of said container.

6. A parachute container, flexible means connected to one side of said container provided with suspension line retainers spaced from said one side of said container, a parachute in said container having a canopy arranged in a plurality of contiguous folded portions between which said means extends, flaps on the container folded over said parachute and second means on said flap portions engaged by said suspension line retainers said parachute having suspension lines provided with portions extending through said suspension line retainers for locking said flap portions of said container in closed position about said parachute.

7. A parachute container with releasable flaps folded about a canopy container and attached spring opened pilot chute, flexible loops attached to one inner side of said canopy container and extending between folds of the canopy of said parachute, said canopy container having flaps provided with apertures through which said loops extend, said parachute having suspension lines passing through said loops outwardly of said apertures whereby said suspension lines are releasably stowed and serve as locking means for flap portions of said canopy container.

8. A parachute having suspension lines, a canopy container having flexible loops attached to one inner side, said container having flaps with apertures, said loops extending between folds of said canopy and through said apertures, said suspension lines passing through said loops outwardly of said apertures whereby said suspension lines are releasably stowed and serve as locking means, said loops and locking means maintaining the container and enclosed canopy in a predetermined flat shape, a pilot chute attached to said canopy container, and a container with releasable flaps folded about the canopy container, and pilot chute.

9. A parachute container having flexible loops in multiple rows therein, a parachute canopy within said container having folded portions between which said loops extend, flaps on said container adapted to fold over said canopy and means on said flap portions engaged by said loops, said lines extending through said loops for the purpose of locking said flap portions together in a predetermined flattened position about said parachute.

10. A parachute container having therein a folded parachute, said container having flap portions folded over said parachute, flexible loops attached in multiple rows to one inner side of said container, said loops extending between folds of said parachute and releasably engaging said flap portions, whereby said container is releasably held in a predetermined flattened position about said parachute.

11. A parachute container having therein a folded parachute, multiple flexible means releasably connecting two opposite sides of said container, said means passing between folds of said parachute, whereby said container is releasably held about said parachute, forming a thin, flat package.

12. A container for a parachute or the like having a suspension line, said container having opposing flaps and a third flap on one side, loops secured to the free edges of said opposing flaps, loops attached to the inner surface of the opposite side of the container and extending through the first mentioned loops and through the third flap, whereby said flaps are held closed when said suspension line is threaded through the second mentioned loops outwardly of said third flap.

13. A parachute having suspension lines and a container therefor, said container having opposing flaps on one side of the container and an apertured flap, loops on the free edges of said opposing flaps, loops attached to the inner surface of the opposite side of said container and passing through the first mentioned loops and through said apertured flap, said lines having portions thereof releasably inserted through the second mentioned loops outwardly of said apertured flap.

14. Apparatus according to claim 13 wherein said parachute is packed in a plurality of folds within said container, said second mentioned loops extending transversely of the container between the folds of the parachute, whereby the folds are retained in position.

JAMES FLOYD SMITH.

References Cited in the file of this patent

UNITED STATES PATENTS

| Number | Name | Date |
| --- | --- | --- |
| 1,631,767 | Russell | June 7, 1927 |
| 2,537,152 | Moran | Jan. 9, 1951 |